(12) United States Patent
Ma et al.

(10) Patent No.: US 10,664,835 B2
(45) Date of Patent: May 26, 2020

(54) BLOCKCHAIN DATA PROTECTION USING HOMOMORPHIC ENCRYPTION

(71) Applicant: Alibaba Group Holding Limited, George Town (KY)

(72) Inventors: Baoli Ma, Hangzhou (CN); Wenbin Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/390,260

(22) Filed: Apr. 22, 2019

(65) Prior Publication Data

US 2019/0251554 A1 Aug. 15, 2019

Related U.S. Application Data

(63) Continuation of application No. PCT/CN2018/114344, filed on Nov. 7, 2018.

(51) Int. Cl.
*G06Q 20/36* (2012.01)
*H04L 9/00* (2006.01)
(Continued)

(52) U.S. Cl.
CPC ..... *G06Q 20/3676* (2013.01); *G06Q 20/3674* (2013.01); *H04L 9/008* (2013.01);
(Continued)

(58) Field of Classification Search
CPC .................................................. G06Q 20/3676
See application file for complete search history.

(56) References Cited

U.S. PATENT DOCUMENTS 7,434,726 B2 10/2008 Hammell et al.
2009/0327141 A1* 12/2009 Rabin .................. G06Q 20/401
705/75
(Continued)

FOREIGN PATENT DOCUMENTS

CN 106910072 6/2017
CN 107240018 10/2017
(Continued)

OTHER PUBLICATIONS

Franca, "Homomorphic Mini-blockchain Scheme," 2015. (Year: 2015).*

(Continued)

*Primary Examiner* — Jacob C. Coppola
(74) *Attorney, Agent, or Firm* — Fish & Richardson P.C.

(57) ABSTRACT

Implementations of the present disclosure include receiving, from a first account, a digitally signed copy of a commitment value of a first amount of a transaction amount generated based on a first random number, the first amount of the balance transfer and the first random number encrypted using a public key of the first account, a second amount of the balance transfer and a second random number encrypted using a public key of the second account, and a set of values generated based on one or more selected random numbers. The first account determines if the first amount and the second amount are the same and if the first random number and the second random number are the same based on the set of values, and updates the balance of the first account and a balance of the second account based on the first amount of the balance transfer.

16 Claims, 8 Drawing Sheets

(51) Int. Cl.
*H04L 9/32* (2006.01)
*H04L 9/06* (2006.01)
*H04L 9/08* (2006.01)

(52) U.S. Cl.
CPC .......... *H04L 9/0637* (2013.01); *H04L 9/0869* (2013.01); *H04L 9/3239* (2013.01); *H04L 9/3247* (2013.01); *H04L 2209/38* (2013.01)

(56) References Cited

U.S. PATENT DOCUMENTS

| | | | | |
|---|---|---|---|---|
| 2012/0296829 | A1* | 11/2012 | Camenisch | G06Q 20/38 705/67 |
| 2012/0317034 | A1* | 12/2012 | Guha | G07F 17/3251 705/65 |
| 2016/0358165 | A1* | 12/2016 | Maxwell | G06Q 20/3829 |
| 2017/0149796 | A1* | 5/2017 | Gvili | H04L 9/085 |
| 2018/0041345 | A1* | 2/2018 | Maim | G06F 21/51 |
| 2018/0139054 | A1* | 5/2018 | Chu | H04L 9/3247 |
| 2019/0164153 | A1* | 5/2019 | Agrawal | G06Q 20/383 |

FOREIGN PATENT DOCUMENTS

| | | |
|---|---|---|
| CN | 108021821 | 5/2018 |
| CN | 108377189 | 8/2018 |
| CN | 108632293 | 10/2018 |
| CN | 108764874 | 11/2018 |
| RU | 2647663 | 3/2018 |
| WO | WO 2018115567 | 6/2018 |

OTHER PUBLICATIONS

Okamoto et al., "A New Public-Key Cryptosystem as Secure as Factoring," Advances in Cryptology—EUROCRYPT '98, International Conference on the Theory and Application of Cryptographic Techniques, Espoo, Finland, May 31-Jun. 4, 1998, all pages. (Year: 1998).*

Groth, "Homomorphic Trapdoor Commitments to Group Elements," all pages. (Year: 2009).*

Cecchetti et al., "Solidus: Confidential Distributed Ledger Transactions via PVORM," Association for Computing Machinery, all pages. (Year: 2017).*

Maxwell, "Confidential Transactions," web.archive.org, all pages. (Year: 2015).*

Shmatikov, Vitaly, "Introduction to Zero-Knowledge," cs.utexas. edu/~shmat/courses/cs380s_fall09/16zk.ppt, web.archive.org, all pages. (Year: 2017).*

Bootle et al., "Bulletproofs: Efficient Range Proofs for Confidential Transactions," 39th IEEE Symposium onSecurity and Privacy, May 2018, all pages. (Year: 2018).*

"From Zero (Knowledge) to Bulletproofs," joinmarket.me/static/ FromZK2BPs_v1.pdf, web.archive.org (Oct. 1, 2018), all pages. (Year: 2019).*

Pedersen, "Non-Interactive and Information-Theoretic Secure Verifiable Secret Sharing," Advances in Cryptology—CRYPTO '91, LNCS 576, pp. 129-140, 1192, all pages. (Year: 1992).*

Damgard et al., "Perfect Hiding and Perfect Binding Universally Composable Commitment Schemes with Constant Expansion Factor," CRYPTO 2002, LNCS 2442, pp. 581-296, 2002, all pages. (Year: 2002).*

Bootle et al., "Bulletproofs: Short Proofs for Confidential Transactions and More," 2018 IEEE Symposium on Security and Privacy, all pages. (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/114344, dated Jul. 29, 2019, 7 pages.

Acar et al., "A Survey on Homomorphic Encryption Schemes: Theory and Implementation," ACM Computing Surveys, Jul. 2018, 51(4):1-35.

Extended European Search Report in European Application No. 18867268.7, dated Dec. 9, 2019, 8 pages.

Wang et al., "Preserving Transaction Privacy in Bitcoin," Future Generation Computer Systems Future Generation Computer Systems, Jan. 2017, 12 pages.

\* cited by examiner

US 10,664,835 B2

BLOCKCHAIN DATA PROTECTION USING HOMOMORPHIC ENCRYPTION

CROSS-REFERENCE TO RELATED APPLICATIONS

This application is a continuation of PCT Application No. PCT/CN2018/114344, filed on Nov. 7, 2018, which is hereby incorporated by reference in its entirety.

BACKGROUND

Blockchain networks, which can also be referred to as blockchain systems, consensus networks, distributed ledger system networks, or blockchain, enable participating entities to securely, and immutably store data. A blockchain can be described as a ledger system of transactions, and multiple copies of the ledger are stored across the blockchain network. Example types of blockchains can include public blockchains, permissioned blockchains and private blockchains. A public blockchain is open for all entities to use the blockchain, and participate in the consensus process. A permissioned blockchain is similar a public blockchain but open only for entities with permission to join. A private blockchain is provided for a particular entity, which centrally controls read, and write permissions.

Blockchains are used in crypto-currency networks, which enable participants to conduct transactions to buy/sell goods, and/or services using a crypto-currency. A common crypto-currency includes Bitcoin. In crypto-currency networks, record-keeping models are used to record transactions between users. Example record-keeping models include the unspent transaction output (UTXO) model, and the account balance model. In the UTXO model, each transaction spends output from prior transactions and generates new outputs that can be spent in subsequent transactions. A user's unspent transactions are tracked, and a balance that the user owns is calculated as the sum of all the user's unspent transactions. In the account balance model, each user's account balance is tracked as a global state. For each transaction, a balance of a spending account is checked to make sure it is larger than or equal to the transaction amount. This is comparable to traditional banking.

A blockchain ledger includes a series of blocks, each of which contains one or more transactions executed in the network. Each block can be analogized to a page of the ledger, while the blockchain itself is a full copy of the ledger. Individual transactions are confirmed and added to a block, which is added to the blockchain. Copies of the blockchain ledger are replicated across nodes of the network. In this manner, there is global consensus on the state of the blockchain. Further, the blockchain is open for all nodes to see, at least in the case of public networks. To protect privacy of blockchain users, encryption technologies can be implemented.

Under the account model, commitment schemes can be used to hide values that both parties of a transaction commit to. Commitment schemes can arise out of the need for parties to commit to a choice or value, and later communicate that value to the other parties involved. For example, in an interactive Pedersen Commitment, party A can commit to a transaction amount t by sending a commitment value PC(r, t) that is generated based on random value r. The commitment value is generated, and party B can only reveal the transaction amount t by obtaining the random number r.

SUMMARY

Implementations of the present disclosure include computer-implemented methods for privacy protected-verification of blockchain transactions without user confirmation, interaction, and revealing transaction amounts or account balances. More particularly, implementations of the present disclosure are directed to validating transactions between blockchain users based on commitment schemes, and homomorphic encryption without revealing transaction amount, account balances, or random numbers for generating commitments to other blockchain nodes In some implementations, actions include receiving, from a first account, a digitally signed copy of a commitment value of a first amount of a transaction amount to be transferred from a first account to a second account generated based on a first random number, the first amount of the balance transfer and the first random number encrypted using a public key of the first account, a second amount of the balance transfer and a second random number encrypted using a public key of the second account, one or more range proofs, and a set of values generated based on one or more selected random numbers; verifying a digital signature corresponding to the digitally signed copy using a public key of the first account corresponding to a private key used to generate the digital signature; determining that the one or more range proofs prove that the amount of the balance transfer is greater than zero and less than or equal to a balance of the first account; determining if the first amount and the second amount are the same and if the first random number and the second random number are the same based on the set of values; and updating the balance of the first account and a balance of the second account based on the first amount of the balance transfer if the first amount and the second amount are the same and the first random number and the second random number are the same. Other implementations include corresponding systems, apparatus, and computer programs, configured to perform the actions of the methods, encoded on computer storage devices.

These and other implementations may each optionally include one or more of the following features: the commitment value is generated using a commitment scheme that is homomorphic; the commitment scheme is a Pedersen commitment scheme; the first amount of the balance transfer and the first random number are encrypted using the public key of the first account based on a probabilistic homomorphic encryption (HE) algorithm, and wherein the second amount of the balance transfer and a second random number are encrypted using the public key of the second account based on the probabilistic HE algorithm; the probabilistic HE algorithm is an Okamoto-Uchiyama HE algorithm; the selected random numbers are represented by $r^*$, $t^*$, $z1^*$, and $z2^*$, and the selected random numbers are used to generate a, b, c, and d, where $a=r^*+xr$, $b=t^*+xt$, $c=z1^*+xz1$, and $d=z2^*+xz2$, r is the first random number, t is the first amount of the balance transfer, x is a hash value; the set of values is further generated based on C, D, and E, where $C=g^{r^*}h^{t^*}$ $D=u2^{r^*}v2^{z1^*}$, $E=u2^{t^*}v2^{z2^*}$, where g, h, u2, and v2 are generators of an elliptical curve, and wherein x is generated based on hashing C, D, and E; the first amount and the second amount are the determined to be the same and the first random number and the second random number are determined to be the same based on properties of probabilistic HE; the first amount and the second amount are determined to be the same and the first random number and the second random number are determined to be the same if $g^a h^b = CT^x$, $u2^a v2^c = DZ\_B1^x$, and $u2^b v2^d = EZ\_B2^x$, where $T=g^r h^t$ is the commitment value of the amount of the balance transfer, $Z\_B1=u2^r v2^{z1}$, $Z\_B2=u2^t v2^{z2}$, and wherein z1 and z2 are random numbers used to encrypt the second amount of the balance transfer and the second random number based on the probabilistic HE scheme; and updating the balance of the first account and a balance of the second account is performed based on HE.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
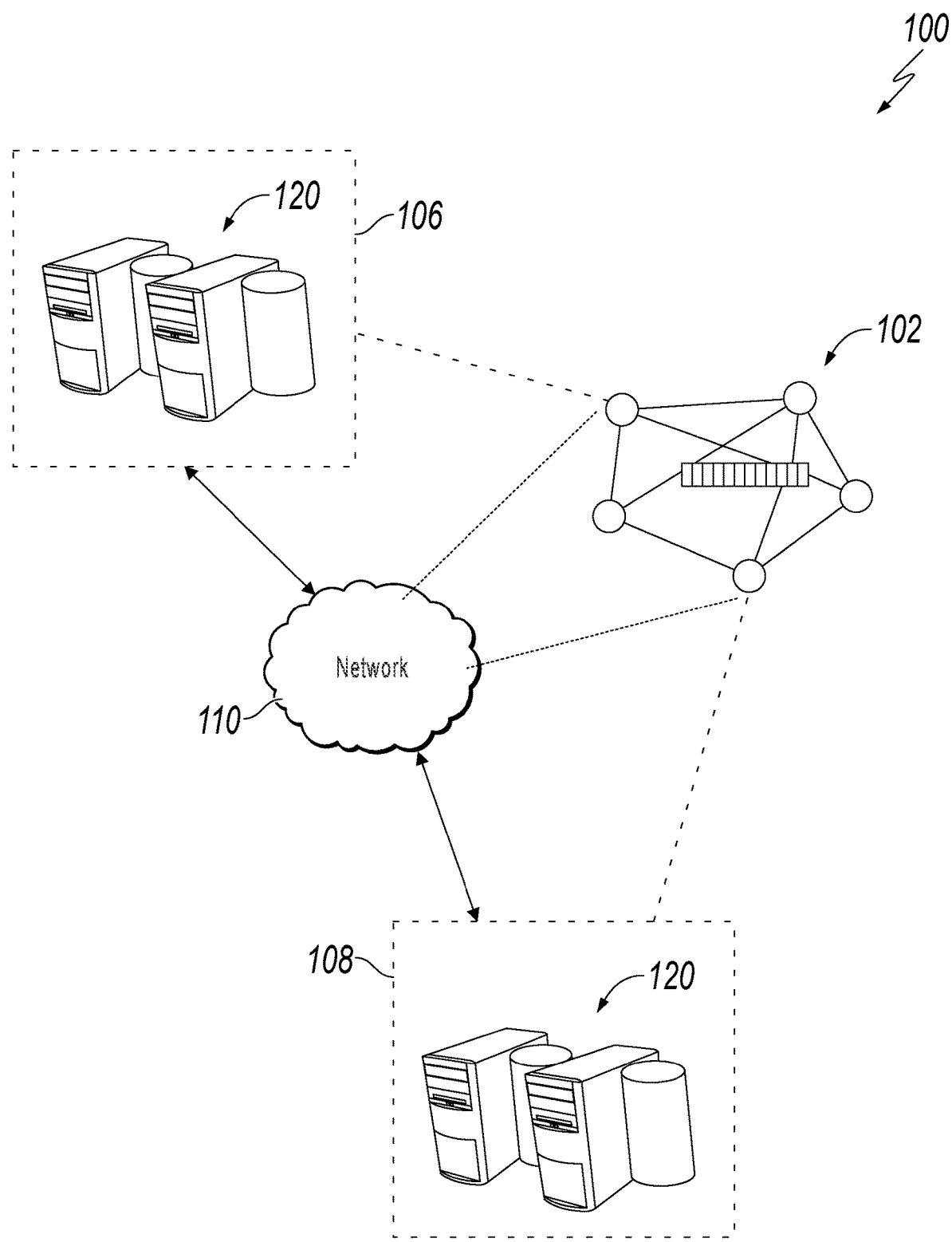
FIG. 1 depicts an example environment that can be used to execute implementations of the present disclosure.

Implementations of the present disclosure include computer-implemented methods for privacy-protected verification of blockchain transactions without user confirmation, interaction, and revealing transaction amounts or account balances. More particularly, implementations of the present disclosure are directed to validating transactions between blockchain users based on commitment schemes, and homomorphic encryptions (HE) without revealing transaction amount, account balances, or random numbers for generating commitments to other blockchain nodes.

To provide further context for implementations of the present disclosure, and as introduced above, blockchain networks, which can also be referred to as consensus networks (e.g., made up of peer-to-peer nodes), distributed ledger system, or simply blockchain, enable participating entities to securely, and immutably conduct transactions, and store data. A blockchain can be provided as a public blockchain, a private blockchain, or a consortium blockchain. Implementations of the present disclosure are described in further detail herein with reference to a public blockchain, which is public among the participating entities. It is contemplated, however, that implementations of the present disclosure can be realized in any appropriate type of blockchain.

In a public blockchain, the consensus process is controlled by nodes of the consensus network. For example, hundreds, thousands, even millions of entities can participate in a public blockchain, each of which operates at least one node in the public blockchain. Accordingly, the public blockchain can be considered a public network with respect to the participating entities. In some examples, a majority of entities (nodes) must sign every block in order for the block to be valid and added to the blockchain. An example public blockchain includes the blockchain used in the Bitcoin network, which is a peer-to-peer payment network (cryptocurrency network). Although the term blockchain is commonly referenced in hand with the Bitcoin network, as used herein, blockchain generally refers to distributed ledgers without particular reference to the Bitcoin network.

In general, a public blockchain supports public transactions. A public transaction is shared with all of the nodes within the blockchain, and the blockchain ledger is replicated across all nodes. That is, all nodes are in perfect state consensus with respect to the blockchain. To achieve consensus (e.g., agreement to the addition of a block to a blockchain), a consensus protocol is implemented within the blockchain network. An example consensus protocol includes, without limitation, proof-of-work (POW) implemented in the Bitcoin network.

Implementations of the present disclosure are described in further detail herein in view of the above context. More particularly, and as introduced above, implementations of the present disclosure are directed to validating transactions between blockchain users based on commitment schemes, and HE without revealing transaction amount, account balances, or random numbers for generating the commitments to other blockchain nodes.

According to the implementations of the present disclosure, blockchain transactions can be validated and recorded to a blockchain (ledger) based on commitment without revealing the transaction account balance, transaction amount, or random number used to generate the commitment. A commitment scheme, such as Pedersen commitment (PC), can be used to generate a commitment of a transaction amount using a random number. The transaction amount and the random number can be encrypted using probabilistic or deterministic HE. The transaction amount and the random number can also be used to generate a set of values as proofs for validating the transaction based on properties of HE. The commitment of the transaction, the encrypted transaction amount, the encrypted random number, and the proofs can be used by a blockchain node to verify whether the transaction is valid without the account balance, the transaction amount, or the random number being revealed.

FIG. 1 depicts an example environment 100 that can be used to execute implementations of the present disclosure. In some examples, the example environment 100 enables entities to participate in a public blockchain 102. The example environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the public blockchain 102. Example computing devices include, without limitation, a server, a desktop computer, a laptop computer, a tablet computing device, and a smartphone. In some examples, the computing systems 106, 108 hosts one or more computer-implemented services for interacting with the public blockchain 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the public blockchain 102 is represented as a peer-to-peer network of nodes, and the computing systems 106, 108 provide nodes of the first entity, and second entity respectively, which participate in the public blockchain 102.

Figure 2:
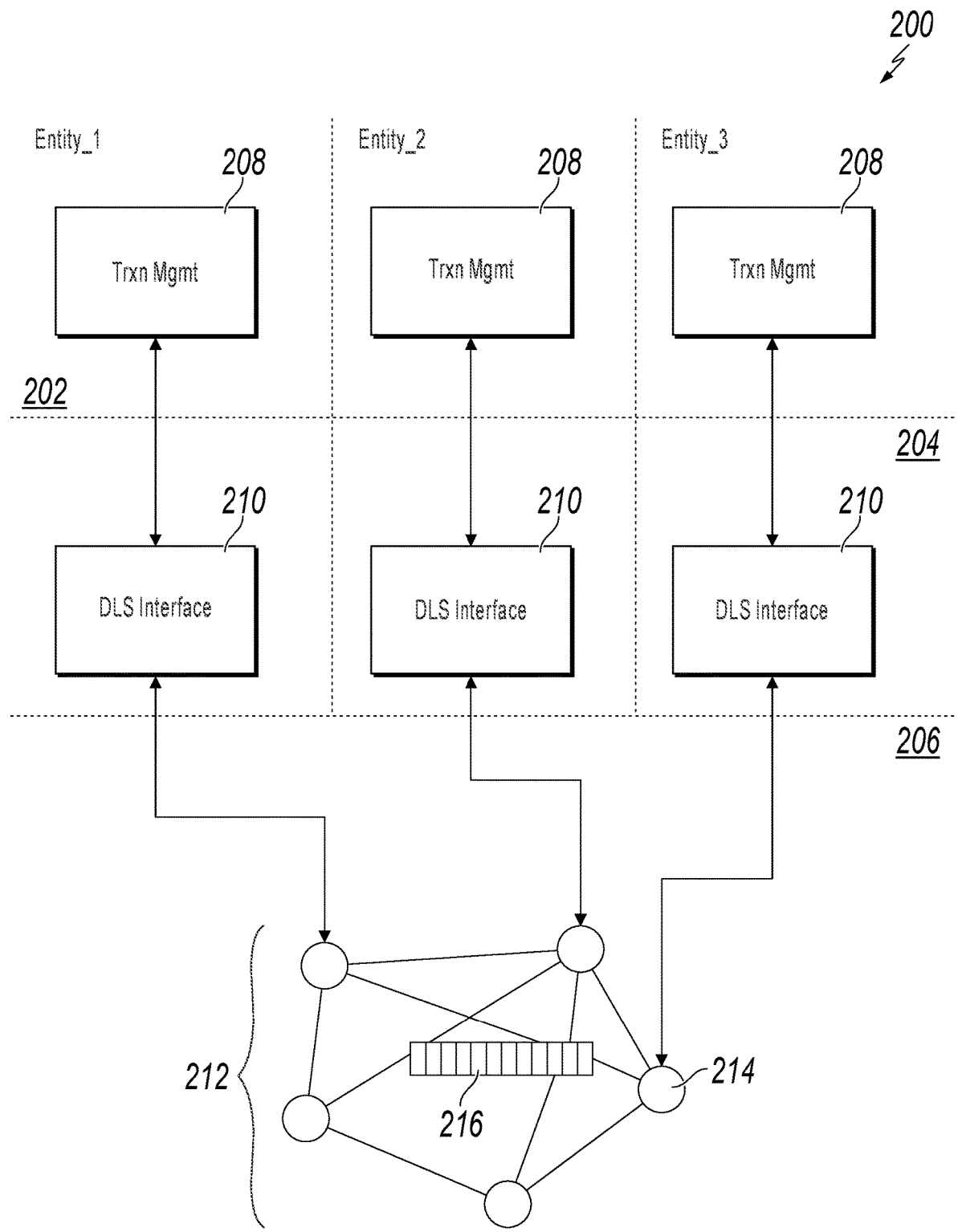
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a public blockchain layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes blockchain interfaces 210 for each transaction management system 208. In some examples, a respective transaction management system 208 communicates with a respective blockchain interface 210 over a network (e.g., the network 110 of FIG. 1) using a communication protocol (e.g., hypertext transfer protocol secure (HTTPS)). In some examples, each blockchain interface 210 provides a communication connection between a respective transaction management system 208, and the blockchain layer 206. More particularly, each blockchain interface 210 enables the respective entity to conduct transactions recorded in a blockchain network 212 of the blockchain layer 206. In some examples, communication between a blockchain interface 210, and the blockchain layer 206 is conducted using remote procedure calls (RPCs). In some examples, the blockchain interfaces 210 "host" blockchain nodes for the respective transaction management systems 208. For example, the blockchain interfaces 210 provide the application programming interface (API) for access to the blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain 212. For example, each node 214 stores a copy of the blockchain 216. In some implementations, the blockchain 216 stores information associated with transactions that are performed between two or more entities participating in the public blockchain.

Figure 3:
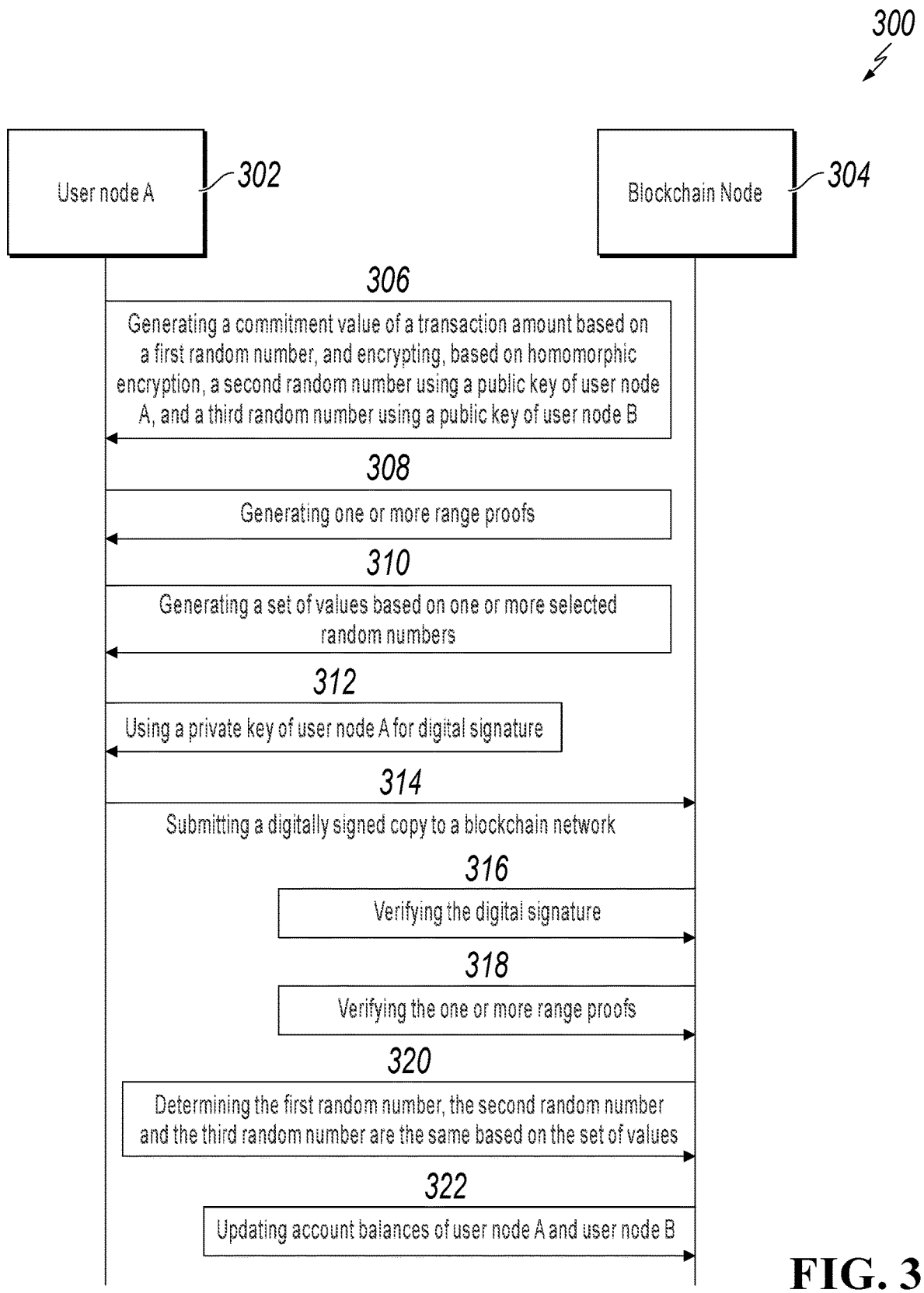
FIG. 3 depicts an example method of privacy-protected validation of a blockchain transaction based on homomorphic encryption in accordance with implementations of the present disclosure.

FIG. 3 depicts an example method 300 of privacy-protected validation of a blockchain transaction based on HE in accordance with implementations of the present disclosure. At a high-level, the example method 300 is performed by a user node A 302, a user node B (not shown in FIG. 3), and a blockchain node 304, also referred to as a consensus node. A transaction, such as a transfer of value, can be made from the user node A 302 to the user node B. To protect account privacy, the user node A 302 can generate a commitment of a transaction amount t using a commitment scheme, such as PC, based on a random number r. The commitment generated using PC can be expressed as PC(r, t). The user node A 302 can also encrypt the random number using HE based on a public key of the user node B. This can be expressed as HE(r). A ciphertext of the transaction amount t, expressed as (PC(r, t), HE(r)) can be transmitted to the user node B. After receiving the ciphertext, the user node B can decrypt the random number r using a private key. The user node B can use the random number r to decrypt the transaction amount t. To prove the validity of the transaction, the blockchain node 304 can compare the random number in the commitment, and the random number encrypted using HE. If the random numbers match, the transaction is determined to be valid by the blockchain node 304 with zero-knowledge of the transaction data. More details of example method 300 are discussed in the following description of FIG. 3.

At 306, the user node A 302 generates a commitment value of a transaction amount based on a first random number, and encrypts, based on HE, a second random number using a public key of user node A 302, and a third random number using a public key of user node B. The first random number, the second random number, and the third random number can be the same random number r used to generate a commitment of a transaction amount t using a commitment scheme. In some implementations, the commitment scheme can have a double exponential form, such as the PC. Using the PC as a non-limiting example, the commitment value generated by the first random number r can be expressed as $PC(r, t)=g^r h^t$, where g and h can be generators of an elliptical curve, PC(r, t) is a scalar multiplication of curve points, and t is the transaction amount that is committed to. It is to be understood that other commitment schemes based on HE, such as Okamoto-Uchiyama (OU) HE, and Boneh-Goh-Nissim HE can also be used to generate the commitment value.

Encryption of the second random number r encrypted using the public key of user node A 302 can be expressed as HE_A(r). Encryption of the third random number r encrypted using the public key of the user node B can be expressed as HE_B(r).

In some implementations, the public key HE encryption can be a deterministic HE that can be obtained from probabilistic HE schemes, such as Paillier HE, Benaloh HE, OU HE, Naccache-Stern HE, Damgard-Jurik HE, or Boneh-Goh-Nissim HE, by setting the random number to a fixed value. In some implementations, deterministic HE schemes that satisfy the linear properties that HE(a+b)=HE(a)+HE(b) and $HE(ab)=HE(b)^a$, where a and b are plaintext used for HE, can be used for the present disclosure.

In some examples, T=PC(r, t), T'=HE_A(r), and T''=HE_B(r), and the ciphertext of the transaction amount can be expressed as (T, T', and T"). The transaction can be determined to be valid, if the example conditions are met. First, the transaction amount t is greater than or equal to 0, and less than or equal to an account balance s_A of the user node A 302. Second, the transaction is digitally signed by the private key of the user node A 302 private key to prove that the transaction is authorized by the user node A 302. Third, the random number r in the commitment PC(r, t) is the same as the r encrypted in the ciphertext HE_A(r), and HE_B(r) using the public keys of the user node A 302 and the user node B, respectively.

In some implementations, the ciphertext can also be separated as a ciphertext of an amount sent (t'), which can be expressed as (PC(r t'), HE_A(r)), and a ciphertext of an amount received (t"), which can be expressed as (PC(r", t"), HE_B(r")). In such cases, the amount sent t' also needs to be determined to be the same as the amount received t" to validate the transaction.

At 308, the user node A 302 generates one or more range proofs. In some implementations, the range proofs can include a range proof RP1 to show that the transaction amount t is greater than or equal to zero, and a range proof RP2 to show that the transaction amount t is less than or equal to an account balance of the user node A.

At 310, the user node A 302 generates a set of values using HE based on one or more selected random numbers. The set of values, denoted as Pf, can include proofs used to prove that the random number r in the commitment PC(r, t) is the same as the r encrypted in the ciphertext HE_A(r) and HE_B(r) using the public keys of the user node A 302 and the user node B, respectively. In some implementations, two random numbers r1 and t1 can be selected to calculate another set of ciphertexts of t1 denoted as (T1, T1', T1"), where $T1=g^{r1}h^{t1}$, T1'=HE_A(r1), T1"=HE_B(r1). Two additional proofs r2 and t2 can be calculated as r2=r1+xr, t2=t1+xt, where x is the Hash of T1, T1', and T1". The set of values can be denoted as Pf=(T1, T1', T1", r2, t2).

At 312, the user node A 302 uses its private key to digitally sign the ciphertext (T, T', T"), the ciphertext (T1, T1', T1"), r2, t2, the range proofs RP1 and RP2, and the public keys of the user node A 302, and the user node B. The digital signature added by the user node A 302 can be used to show that the transaction is authorized by the user node A 302. The digitally signed copy is submitted to the blockchain network at 314.

At 316, the blockchain node 304 verifies the digital signature using a public key of the user node A 302. The blockchain node 304 can be a consensus node that can prove the validity of transactions in the blockchain network. If the blockchain node 304 cannot verify the digital signature of the user node A 302 using the public key, the digital signature can be determined to be incorrect, and the transaction can be denied. In some implementations, the blockchain node 304 can also include an anti-double spending mechanism. The blockchain node 304 can verify whether the transaction has already been executed or recorded. If the transaction has already been executed, the transaction can be rejected. Otherwise, the validation of the transaction can proceed.

At 318, the blockchain node 304 verifies the one or more range proofs. For example, the range proof RP1 can be used to prove that the transaction amount t is greater than or equal to zero, and the range proof RP2 can be used to prove that the transaction amount t is less than or equal to an account balance of the user node A 302.

At 320, the blockchain node 304 determines that the first random number, the second random number, and the third random number are the same based on the set of values. In some implementations, the determination includes determining whether the example conditions $g^{r2}h^{t2}=T^xT1$, HE_A(r2)=$T'^xT1'$, and HE_B(r2)=$T''^x_xT1''$ are true based on the properties of deterministic HE, as discussed above. If true, it can be indicated that the random number in the commitment is the same as the random numbers homomorphically encrypted using the public keys of the user node A 302, and the user node B, and the transaction is valid.

At 322, the blockchain node 304 updates the account balances of the user node A 302, and the user node B. The balance updates can be performed based on properties of HE without revealing the account balances of either the user node A 302, or the user node B. Updating of the account balances is described in further detail herein with reference to FIG. 4.

Figure 4:
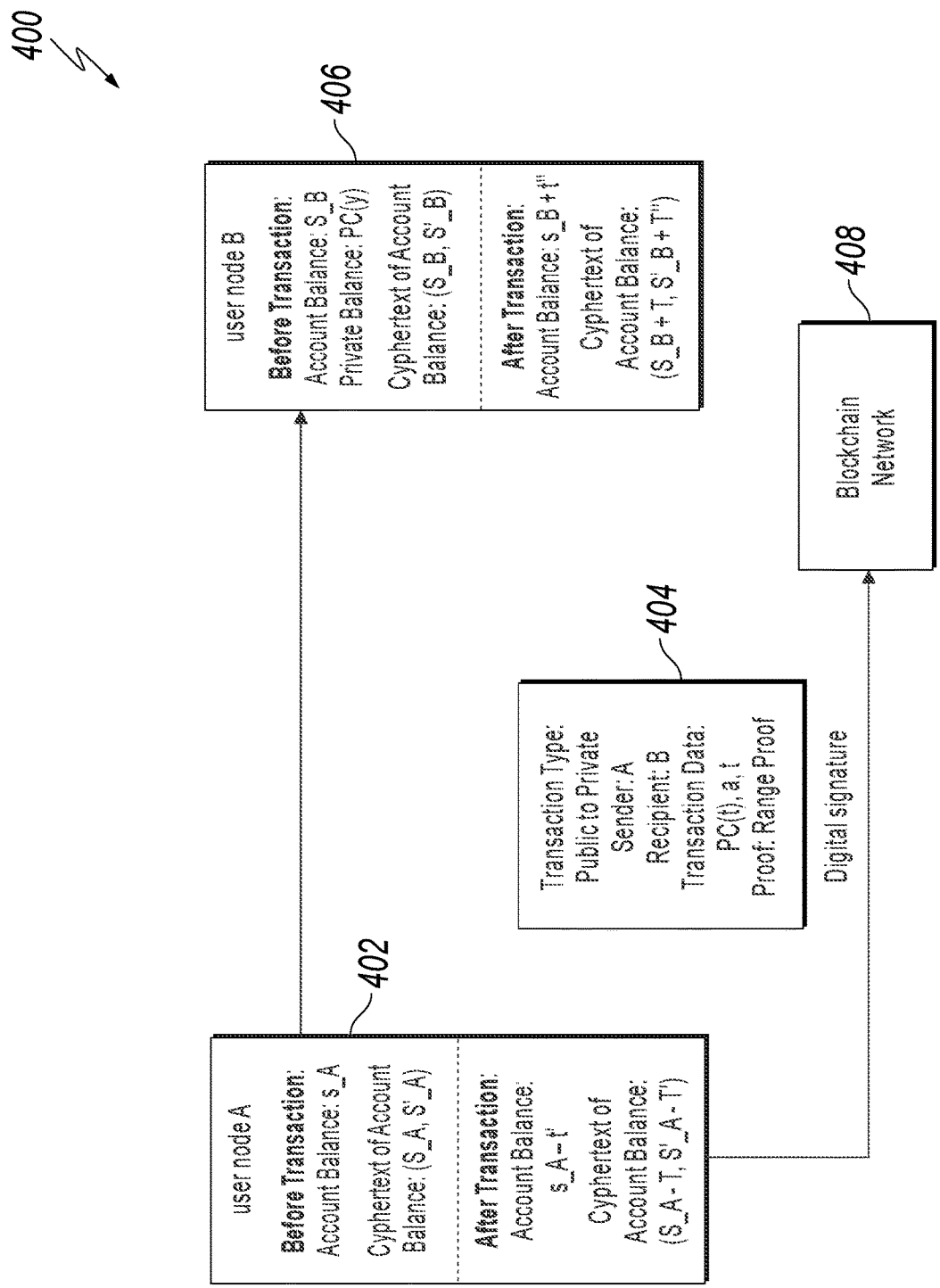
FIG. 4 depicts an example blockchain transaction based on homomorphic encryption in accordance with implementations of the present disclosure.

FIG. 4 depicts an example blockchain transaction 400 based on HE in accordance with implementations of the present disclosure. As shown in the example blockchain transaction 400, a user node A 402 transfers a transaction amount t to a user node B 406. Before the transaction, the user node A 402 has an account balance of s_A, and the user node B 406 has an account balance of s_B.

Using the encryption schemes and transaction process described herein with reference to FIG. 3 as an example, the account balance s_A can be encrypted using a random number r_A based on PC, and the random number r_A can be encrypted based on HE. The ciphertext of the account balance s_A can be expressed as (S_A, S'_A)=$(g^{r\_A}h^{s\_A}$, HE_A(r_A)), where g and h can be generators of an elliptical curve for generating the PC of the account balance s_A. Similarly, an account balance s_B of the user node B 406 can be encrypted using a random number r_B based on PC. The ciphertext of the account balance s_B can be expressed as (S_B, S'_B)=$(g^{r\_B}h^{s\_B}$, HE_A(r_B)).

At 404, the user node A 402 can add digital signature to the proofs used to validate the transaction, and submit the digitally signed copy to the blockchain network 408. As described above with reference to FIG. 3, the proofs can include the ciphertext of transaction amount (T, T', T"), the one or more range proofs (RP1, RP2), and other proofs (T1, T1', T1", r2, t2).

After the transaction, the account balance of the user node A 402 can be expressed as s_A−t', and the account balance of the user node B 406 can be expressed as s_B+t", where t' is the amount sent by the user node A 402 and t" is the amount received by the user node B. The ciphertext of the account balance of the user node A 402 after the transaction can be expressed as (S_A/T, S'_A/T') and the ciphertext of the account balance of the user node B 406 after the transaction can be expressed as (S_B*T, S'_B*T"). Since S_A, S'_A, S_B, S'_B, T, T', T" are each encrypted using HE with double exponential form, addition and subtraction can be performed in their encrypted form without decrypting to the plaintext values.

Figure 5:
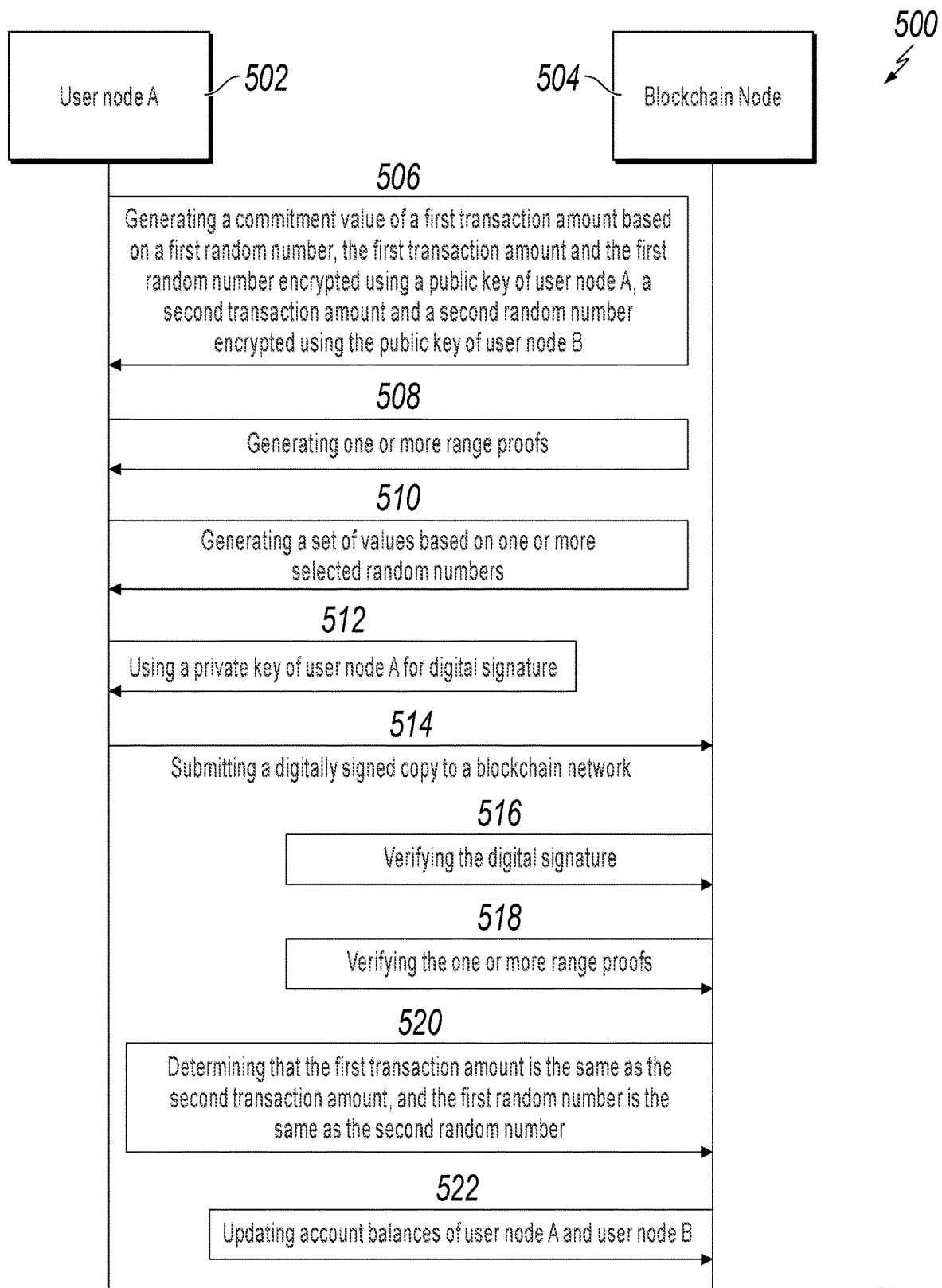
FIG. 5 depicts another example method of privacy-protected validation of a blockchain transaction based on homomorphic encryption in accordance with implementations of the present disclosure.

FIG. 5 depicts another example method 500 of privacy-protected validation of a blockchain transaction based on HE in accordance with implementations of the present disclosure. At a high-level, the example method 500 is performed by a user node A 502, a user node B (not shown in FIG. 5), and a blockchain node 504, which can be referred to as a consensus node. A transaction, such as a transfer of value, can be made from the user node A 502 to the user node B. To protect account privacy, the user node A 502 can generate a commitment of the transaction amount t using a commitment scheme such as PC based on a random number r. The commitment generated using PC can be expressed PC(r, t).

The user node A 502 can also encrypt the transaction amount t, and the random number r using HE that has a double exponential form, such as the OU.

A ciphertext of the transaction amount t can be submitted to the blockchain network. After receiving the ciphertext, the blockchain node 504 can determine whether the random number r hidden in PC matches the random number r encrypted in OU using the public keys of the user node A 502, and the user node B, respectively. Further, the blockchain node 504 can determined whether the transaction amount t hidden in PC matches the transaction amount t encrypted in OU using the public keys of the user node A 502, and the user node B, respectively. If both the random numbers and the transaction amounts match, the transaction can be determined to be valid by the blockchain node 504 with zero-knowledge of the transaction data.

At 506, the user node A 502 generates a commitment value of a first transaction amount based on a first random number, and the first transaction amount and the first random number encrypted using a public key of the user node A 502. A second transaction amount and a second random number are encrypted using a public key of the user node B. The first transaction amount and the second transaction amount can be the same amount t. The first random number and the second random number can be the same random number r used to generate a commitment of the transaction amount t using a commitment scheme. In some implementations, the commitment scheme can have a double exponential form, such as the PC. Using the PC as an example, the commitment value generated by the first random number r can be expressed as $PC(r, t)=g^r h^t$, where g and h can be generators of an elliptical curve, $PC(r, t)$ is a scalar multiplication of curve points, and t is the transaction amount that is committed to. It is to be understood that other commitment schemes based on HE, such as OU HE and Boneh-Goh-Nissim HE can also be used to generate the commitment value.

The user node A 502 can also encrypt the first random number and the first transaction amount using the public key of the user node A 502, and encrypt the second random number and the second transaction amount using the public key of the user node B. In some implementations, the encryption of the random numbers and the transaction amounts can be based on probabilistic HE, such as OU. Using OU as an example, encryption of the first random number and the first transaction amount using the public key of the user node A 502 can be expressed as $OU\_A(r)=u1^r v1^{y1}$, and $OU\_A(t)=u1^r v1^{y2}$, respectively, where u1 and v1 are generators on the elliptical curve, and y1 and y2 are random numbers used to generate $OU\_A(r)$ and $OU\_A(t)$. The encrypted second random number and second transaction amount can be expressed as $OU\_B(r)=u2^r v2^{z1}$ and $OU\_B(t)=u2^r v2^{z2}$, respectively, where u2 and v2 are generators on the elliptical curve, and z1 and z2 are random numbers used to generate $OU\_B(r)$ and $OU\_B(t)$, respectively. Probabilistic OU satisfies the property that $OU(a+b)=OU(a)*OU(b)$, where a and b are the plaintext used for OU.

The ciphertext of the transaction amount t can be expressed as $(PC(r, t), OU\_A(r), OU\_A(t), OU\_B(r), OU\_B(t))$. The transaction can be determined to be valid, if the following example conditions are met. First, the transaction amount t is greater than or equal to 0, and less than or equal to the account balance s_A of the user node A 502. Second, the transaction is digitally signed using the private key of the user node A 502 private key to prove that the transaction is authorized by the user node A 502. Third, the random number r in the commitment PC(r, t) is the same as the r encrypted in the ciphertext OU_A(r) and OU_B(r) using the public keys of the user node A 502 and user node B, respectively. Fourth, the transaction amount t in the commitment PC(r, t) is the same as the t encrypted in the ciphertext OU_A(t) and OU_B(t) using the public keys of the user node A 502 and the user node B, respectively.

In some implementations, the ciphertext can also be separated as a ciphertext of an amount sent (t'), which can be expressed as $(PC(r', t'), OU\_A(r'), OU\_A(t'))$, and a ciphertext of an amount received (t''), which can be expressed as $(PC(r'', t''), OU\_B(r''), OU\_B(t''))$. In such cases, the amount sent t' also needs to be determined to be equal to the amount received t'' to validate the transaction.

At 508, the user node A 502 generates one or more range proofs. In some implementations, the range proofs can include a range proof RP1 to show that the transaction amount t is greater than or equal to zero, and a range proof RP2 to show that the transaction amount t is less than or equal to an account balance of the user node A.

At 510, the user node A 502 generates a set of values using HE based on one or more selected random numbers. The set of values denoted as Pf can include proofs used to prove that the random number r in the commitment PC(r, t) is the same as the r encrypted in the ciphertext OU_A(r) and OU_B(r), and the transaction amount t in the commitment PC(r, t) is the same as the t encrypted in the ciphertext OU_A(t) and OU_B(t). In some implementations, four random numbers r*, t*, z1*, and z2* can be selected to calculate another set of ciphertexts denoted as (C, D, E), where $C=g^{r*} h^{t*}$, $D=u2^{r*} v2^{z1*}$, and $E=u2^{t*} v2^{z2*}$, where g, h, u2, and v2 are generators of an elliptical curve. Four additional proofs a, b, c, and d can be calculated as $a=r*+xr$, $b=t*+xt$, $c=z1*+xz1$, and $d=z2*+xz2$, where x is a hash function of g, h, u2, v2, C, D, and E. The set of values can then be denoted as $Pf=(C, D, E, a, b, c, d)$.

At 512, the user node A 502 uses its private key to digitally sign the ciphertext (PC(r, t), OU_A(r), OU_A(t), OU_B(r), OU_B(t)), the range proofs RP1 and RP2, and the set of values PI The digital signature added by the user node A 502 can be used to show that the transaction is authorized by the user node A 502. The digitally signed copy is submitted to the blockchain network at 514.

At 516, the blockchain node 504 verifies the digital signature using a public key of the user node A 502. The blockchain node 504 can be a consensus node that can prove the validity of transactions on the blockchain network. If the blockchain node 504 cannot verify the digital signature using the public key of the user node A, the digital signature can be determined to be incorrect, and the transaction can be denied. In some implementations, the blockchain node 504 can also include an anti-double spending mechanism. The blockchain node 504 can verify whether the transaction has already been executed or recorded. If the transaction has already been executed, the transaction can be rejected. Otherwise, the validation of the transaction can proceed.

At 518, the blockchain node 504 verifies the one or more range proofs. For example, the range proof RP1 can be used to prove that the transaction amount t is greater than or equal to zero, and the range proof RP2 can be used to prove that the transaction amount t is less than or equal to an account balance of user node A 502.

At 520, the blockchain node 504 determines whether the first transaction amount is the same as the second transaction amount, and whether the first random number is the same as the second random number based on the set of values. In some implementations, the determination includes determining if $g^a h^b=CT^x$, $u2^a v2^c=DZ\_B1^x$, and $u2^b v2^d=EZ\_B2^x$, where $T=g^t h^r$ is the commitment value of the first transaction amount t, $Z\_B1=u2^r v2^{z1}$, $Z\_B2=u2^t v2^{z2}$, and wherein z1 and z2 are random numbers used to encrypt the second transaction amount and the second random number based on the probabilistic HE scheme. If true, it can be indicated that the random number and the transaction amount in the commitment are, respectively, the same as the random numbers and the transaction amounts homomorphically encrypted using the public key of the user node A 502 and user node B, and the transaction is valid.

At 522, the blockchain node 504 updates the account balances of the user node A 502 and the user node B. The account balance updates can be performed based on properties of HE without revealing the account balances of the user node A 502, and/or the user node B.

Figure 6:
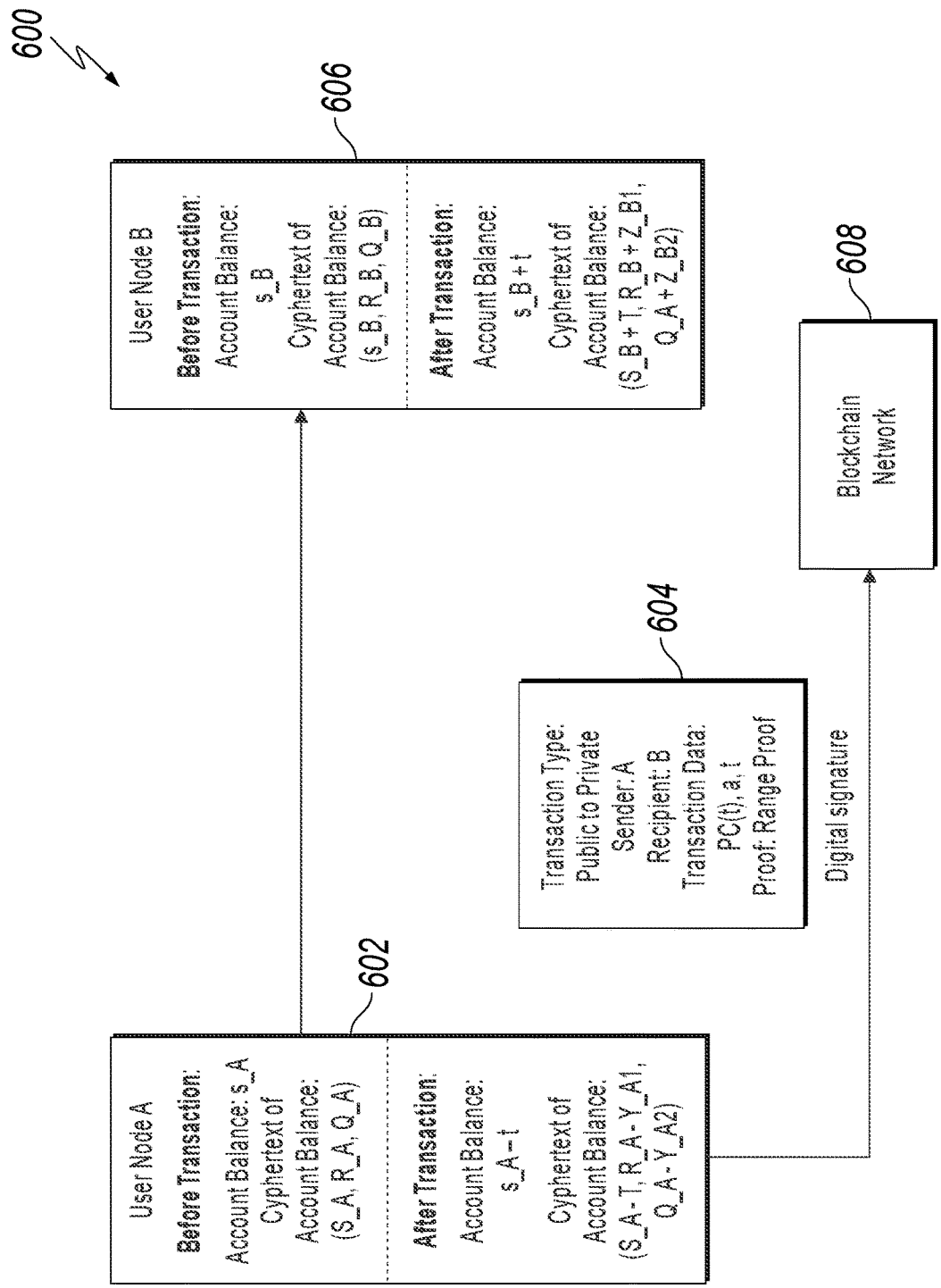
FIG. 6 depicts another example blockchain transaction based on homomorphic encryption in accordance with implementations of the present disclosure.

FIG. 6 depicts another example blockchain transaction 600 based on HE in accordance with implementations of the present disclosure. As shown in the example transaction 600, a user node A 602 transfers a transaction amount t to a user node B 606. Before the transaction, the user node A 602 has an account balance of s_A, and the user node B 606 has an account balance of s_B.

In some examples, the account balance s_A can be hidden using a random number r_A based on PC using the encryption schemes and transaction process described herein with reference to FIG. 5. The random number r_A and the account balance can be encrypted based on OU. The ciphertext of the account balance s_A can be expressed as (S_A, R_A, Q_A)=($g^{r\_A} h^{s\_A}$, OU_A(r_A), OU_A(s_A)), where g and h can be generators of an elliptical curve for generating the PC of the account balance s_A. Similarly, an account balance s_B of the user node B 606 can be encrypted using a random number r_B based on PC. The ciphertext of the account balance s_B can be expressed as (S_B, S'_B)= ($g^{r\_B} h^{s\_B}$, OU_B(r_B), OU_B(s_B)).

At 604, the user node A 602 can add a digital signature to the proofs used to validate the transaction, and submit the digitally signed copy to the blockchain network 608. As described herein with reference to FIG. 5, the proofs can include the ciphertext of transaction amount (PC(r, t), OU_A (r), OU_A(t), OU_B(r), OU_B(t)), the one or more range proofs (RP1, RP2), and other proofs (C, D, E, a, b, c, d).

After the transaction, the account balance of the user node A 602 can be expressed as s_A−t, and the account balance of the user node B 606 can be expressed as s_B+t. The ciphertext of the account balance of the user node A 602 after the transaction can be expressed as (S_A/T, R_A/Y_A1, Q_A/Y_A2), where Y_A1=OU_A(r) and Y_A2=OU_A(t). The ciphertext of the account balance of the user node B 606 after the transaction can be expressed as (S_B*T, R_B*Z_B1, Q_B*Z_B2), where Z_B1=OU_B (r) and Z_B2=OU_B(t). Since S_A, S_B, R_A, R_B, Q_A, Q_B, Y_A1, Y_A2, Z_B1, Z_B2, and T are encrypted using HE with double exponential form, addition and subtraction can be performed in their encrypted form without decrypting the plaintext values.

Figure 7:
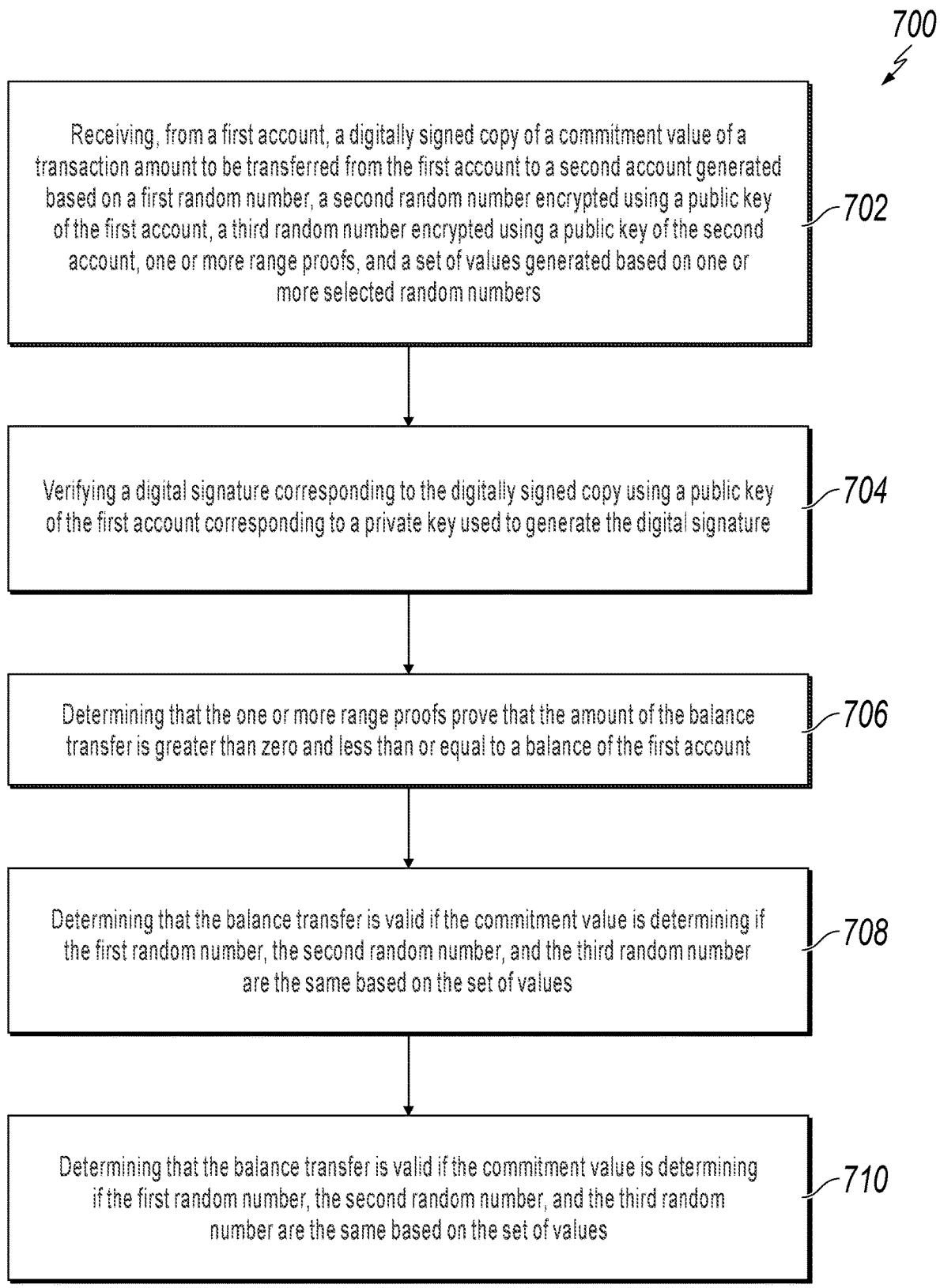
FIG. 7 depicts an example process that can be executed in accordance with implementations of the present disclosure.

FIG. 7 depicts an example process 700 that can be executed in accordance with implementations of the present disclosure. For clarity of presentation, the description that follows generally describes method 700 in the context of the other figures in this description. However, it will be understood that the example process 700 can be performed, for example, by any system, environment, software, and hardware, or a combination of systems, environments, software, and hardware, as appropriate. In some implementations, steps of the example process 700 can be run in parallel, in combination, in loops, or in any order.

At 702, a consensus node receives, from a first account, a digitally signed copy of a commitment value of a transaction amount to be transferred from the first account to a second account generated based on a first random number. The consensus node can also receive from the first account, a second random number encrypted using a public key of the first account, a third random number encrypted using a public key of the second account, one or more range proofs, and a set of values generated using HE based on one or more selected random numbers. In some implementations, the commitment value is generated using HE based commitment scheme. In some implementations, the second random number and the third random number are encrypted based on deterministic HE scheme.

In some implementations, the set of values are represented by (T1, T1', T1", r2, t2), where r2=r1+xr, t2=t1+xt, where r1 and t1 represent the one or more selected random numbers, and r represents the first random number, t represents the amount of the balance transfer. In some examples, $T1=g^{r1} h^{t1}$, T1'=HE_A(r1), T1"=HE_B(r1), where g and h are generators of an elliptical curve, HE_A(r1) is generated based on HE of r1 using the public key of the first account, and HE_B(r1) is generated based on HE of r1 using the public key of the second account. In some examples, x is generated based on hashing T1, T1' and T1".

At 704, the consensus node verifies a digital signature corresponding to the digitally signed copy using a public key of the first account corresponding to a private key used to generate the digital signature.

At 706, the consensus node determines whether the one or more range proofs prove that the amount of the balance transfer is greater than zero, and less than or equal to a balance of the first account.

At 708, the consensus node determines whether the first random number, the second random number, and the third random number are the same based on the set of values. In some implementations, the first random number, the second random number, and the third random number are determined to be the same if $g^{r2} h^{t2}=T^x T1$, HE_A(r2)=$T'^x T1'$, and HE_B(r2)=$T''^x T1''$, where $T=g^t h^r$ is the commitment value of the amount of the balance transfer, T'=HE_A(r), and T"=HE_B(r), HE_A(r) is generated based on HE of r using the public key of the first account, HE_B(r) is generated based on HE of r using the public key of the second account, HE_A(r2) is generated based on HE of r2 using the public key of the first account, and HE_B(r2) is generated based on HE of r2 using the public key of the second account, x is generated based on hashing g, h, T1, T1' and T1". In some implementations, T, T', and T" form the ciphertext of the amount of the transaction amount t.

At 710, the consensus node updates the balance of the first account and a balance of the second account based on the transaction amount, if the first random number, the second random number, and the third random number are the same. In some implementations, updating the balance of the first account and the balance of the second account is performed based on HE.

Figure 8:
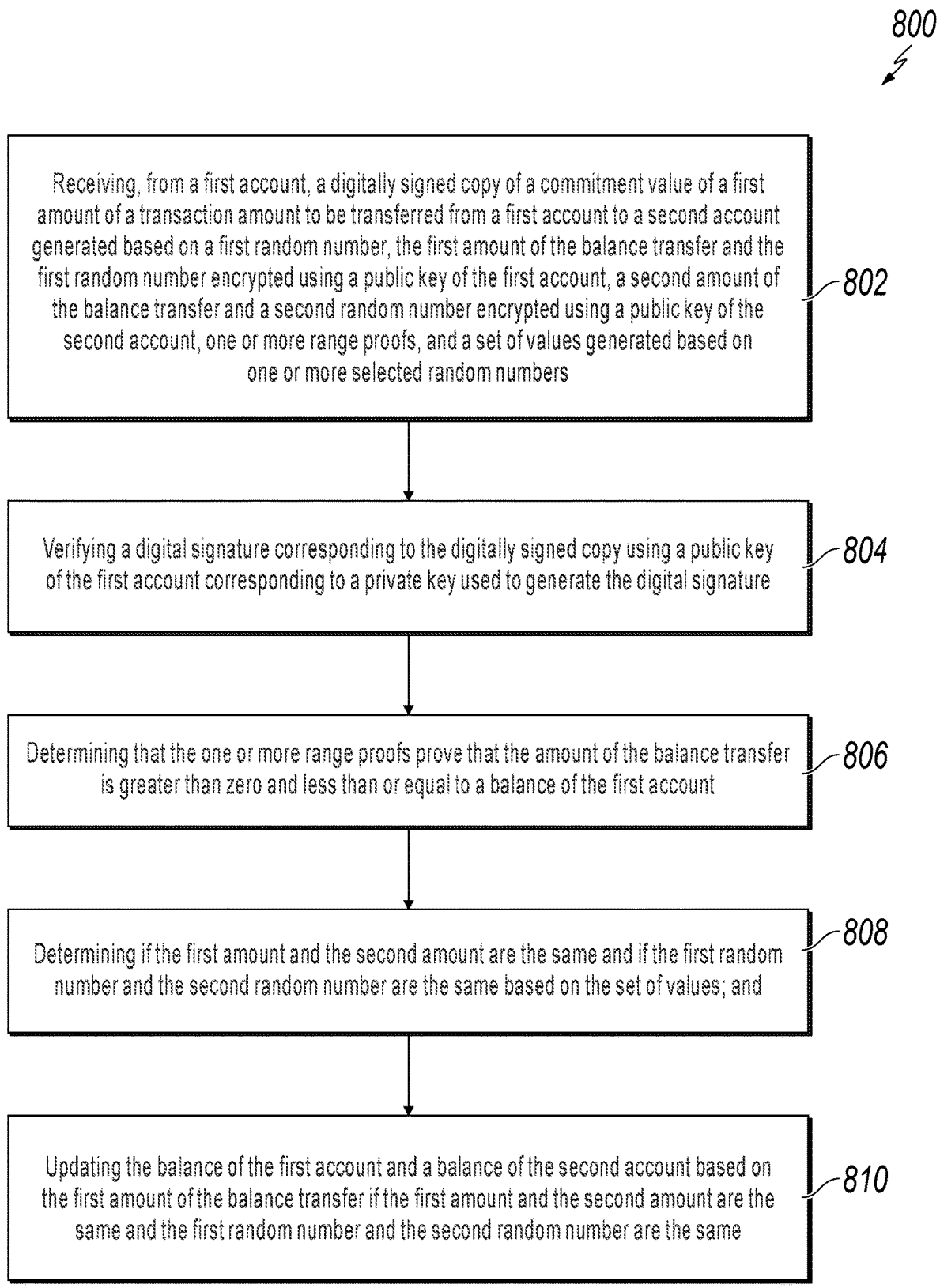
FIG. 8 depicts another example process that can be executed in accordance with implementations of the present disclosure.

FIG. 8 depicts another example process 800 that can be executed in accordance with implementations of the present disclosure. For clarity of presentation, the description that follows generally describes the example process 800 in the context of the other figures in this description. However, it will be understood that the example process 800 can be performed, for example, by any system, environment, software, and hardware, or a combination of systems, environimplementations, steps of the example process 800 can be run in parallel, in combination, in loops, or in any order.

At 802, a consensus node receives, from a first account, a digitally signed copy of a commitment value of a first transaction amount for a transfer from a first account to a second account. In some examples, the digitally signed copy of the commitment value is generated based on a first random number. The consensus node also receives the first transaction amount and the first random number encrypted using a public key of the first account, a second amount of the balance transfer and a second random number encrypted using a public key of the second account, one or more range proofs, and a set of values generated using HE based on one or more selected random numbers. In some implementations, the commitment value is generated using the PC scheme. In some implementations, the first amount of the balance transfer and the first random number are encrypted using the public key of the first account based on a probabilistic HE algorithm. In some examples, the second amount of the balance transfer and a second random number are encrypted using the public key of the second account based on the probabilistic HE algorithm. In some implementations, the probabilistic HE algorithm is an Okamoto-Uchiyama HE algorithm.

In some implementations, the set of values are represented by (C, D, E, a, b, c, d), where $a=r^*+xr$, $b=t^*+xt$, $c=z1^*+xz1$, and $d=z2^*+xz2$, where $r^*$, $t^*$, $z1^*$, and $z2^*$ represent the one or more selected random numbers, r represents the first random number, t represents the first amount of the balance transfer, $C=g^{r^*}h^{t^*}$, $D=u2^{r^*}v2^{z1^*}$, $E=u2^{t^*}v2^{z2^*}$, g, h, u2, and v2 are generators of an elliptical curve, and x is generated based on hashing C, D, and E.

At 804, the consensus node verifies a digital signature corresponding to the digitally signed copy using a public key of the first account corresponding to a private key used to generate the digital signature.

At 806, the consensus node determines whether the one or more range proofs prove that the amount of the balance transfer is greater than zero, and less than or equal to a balance of the first account.

At 808, the consensus node determines whether the first amount is the same as the second amount, and whether the first random number and the second random number are the same based on the set of values. In some implementations, the first amount and the second amount are determined to be the same, and the first random number and the second random number are determined to be the same, if $g^a h^b = CT^x$, $u2^a v2^c = DZ\_B1^x$, and $u2^b v2^d = EZ\_B2^x$, where $T=g^t h^t$ is the commitment value of the amount of the balance transfer, $Z\_B1=u2^r v2^{z1}$, $Z\_B2=u2^t v2^{z2}$. In some examples, z1 and z2 are random numbers used to encrypt the second transaction amount and the second random number based on the probabilistic HE scheme.

At 810, the consensus node updates a balance of the first account and a balance of the second account based on the first amount of the balance transfer, if the first amount and the second amount are the same, and the first random number and the second random number are the same. In some implementations, updating the balance of the first account and a balance of the second account is performed based on HE.

Implementations of the subject matter described in this specification can be implemented so as to realize particular advantages or technical effects. For example, implementations of the present disclosure permits account balance and transaction amount of blockchain nodes to be private during transactions. The recipient of fund transfer does not need to confirm the transaction or use a random number to verify a commitment, the transaction validation can be non-interactive. A blockchain node can validate the transaction based on HE and commitment schemes to allow zero-knowledge proof.

The described methodology permits enhancement of account/data security of various mobile computing device. The balance of the accounts and transaction amounts can be encrypted based on HE and hidden by commitment schemes. As such, a consensus node can update the account balances in the ledger after transaction based on properties of HE without revealing the actual account balance of the account. Because the random number does not need to be sent to a recipient to confirm the transaction, the risk of data leakage can be reduced and less computing and memory resources need to be used to manage the random number.

Implementations and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, implementations can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, performed by a consensus node of a blockchain network, comprising:
   receiving, from a first account:
   a digitally signed copy of a commitment value of a first amount of a balance transfer from a first account to a second account generated based on a first random number, wherein the first amount of the balance transfer and the first random number are encrypted using a first public key of the first account based on a probabilistic homomorphic encryption (HE) algorithm;
   a second amount of the balance transfer and a second random number, wherein the second amount and the second random number are encrypted using a public key of the second account based on the probabilistic HE algorithm;
   one or more range proofs; and
   a set of values generated based on one or more selected random numbers;
   verifying a digital signature corresponding to the digitally signed copy using a second public key of the first account corresponding to a private key used to generate the digital signature;
   determining that the one or more range proofs prove that the amount of the balance transfer is greater than zero and less than or equal to a balance of the first account;
   determining if the first amount and the second amount are the same and if the first random number and the second random number are the same based on the encrypted first and second amounts, the encrypted first and second random numbers, and the set of values; and
   updating the balance of the first account and a balance of the second account based on the first amount of the balance transfer in response to determining the first amount and the second amount are the same and the first random number and the second random number are the same, wherein the selected random numbers are represented by r*, t*, z1*, and z2*; the selected random numbers are used to generate a, b, c, d, C, D, and E; where a=r*+xr, b=t*+xt, c=z1*+xz1, d=z2*+xz2, $C=g^{r*}h^{t*}$, $D=u2^{r*}v2^{z1*}$, and $E=u2^{r*}v2^{z2*}$, where r is the first random number, t is the first amount of the balance transfer, z1 and z2 are random numbers used to encrypt the second transaction amount and the second random number, x is a hash value generated based on hashing C, D, E, and g, and where h, u2, and v2 are generators of an elliptical curve.

2. The computer-implemented method of claim 1, wherein the commitment value is generated using a commitment scheme that is homomorphic.

3. The computer-implemented method of claim 2, wherein the commitment scheme is a Pedersen commitment scheme.

4. The computer-implemented method of claim 1, wherein the probabilistic HE algorithm is an Okamoto-Uchiyama HE algorithm.

5. The computer-implemented method of claim 1, wherein the set of values is further generated based on C, D, and E.

6. The computer-implemented method of claim 5 wherein the first amount and the second amount are the determined to be the same and the first random number and the second random number are determined to be the same based on properties of probabilistic HE.

7. The computer-implemented method of claim 6, wherein the first amount and the second amount are determined to be the same and the first random number and the second random number are determined to be the same if $g^a h^b = CT^x$, $u2^a v2^c = DZ\_B1^x$, and $u2^b v2^d = EZ\_B2^x$, where $T=g^t h^t$ is the commitment value of the amount of the balance transfer, $Z\_B1=u2^r v2^{z1}$, $Z\_B2=u2^r v2^{z2}$.

8. The computer-implemented method of claim 1, wherein updating the balance of the first account and a balance of the second account is performed based on HE.

9. A non-transitory, computer-readable medium storing one or more instructions executable by a computer system to perform operations comprising:
   receiving, from a first account:
      a digitally signed copy of a commitment value of a first amount of a balance transfer from a first account to a second account generated based on a first random number, wherein the first amount of the balance transfer and the first random number are encrypted using a first public key of the first account based on a probabilistic homomorphic encryption (HE) algorithm;
      a second amount of the balance transfer and a second random number, wherein the second amount and the second random number are encrypted using a public key of the second account based on the probabilistic HE algorithm;
      one or more range proofs; and
      a set of values generated based on one or more selected random numbers;
   verifying a digital signature corresponding to the digitally signed copy using a second public key of the first account corresponding to a private key used to generate the digital signature;
   determining that the one or more range proofs prove that the amount of the balance transfer is greater than zero and less than or equal to a balance of the first account;
   determining if the first amount and the second amount are the same and if the first random number and the second random number are the same based on the encrypted first and second amounts, the encrypted first and second random numbers, and the set of values; and
   updating the balance of the first account and a balance of the second account based on the first amount of the balance transfer in response to determining the first amount and the second amount are the same and the first random number and the second random number are the same, wherein the selected random numbers are represented by r*, t*, z1*, and z2*; the selected random numbers are used to generate a, b, c, d, C, D, and E; where a=r*+xr, b=t*+xt, c=z1*+xz1, d=z2*+xz2, $C=g^{r*}h^{t*}$, $D=u2^{r*}v2^{z1*}$, and $E=u2^{r*}v2^{z2*}$, where r is the first random number, t is the first amount of the balance transfer, z1 and z2 are random numbers used to encrypt the second transaction amount and the second random number, x is a hash value generated based on hashing C, D, E, and g, and where h, u2, and v2 are generators of an elliptical curve.

10. The non-transitory, computer-readable medium of claim 9, wherein the commitment value is generated using a commitment scheme that is homomorphic.

11. The non-transitory, computer-readable medium of claim 10, wherein the commitment scheme is a Pedersen commitment scheme.

12. The non-transitory, computer-readable medium of claim 9, wherein the probabilistic HE algorithm is an Okamoto-Uchiyama HE algorithm.

13. The non-transitory, computer-readable medium of claim 9, wherein the set of values is further generated based on C, D, and E.

14. The non-transitory, computer-readable medium of claim 13 wherein the first amount and the second amount are the determined to be the same and the first random number and the second random number are determined to be the same based on properties of probabilistic HE.

15. The non-transitory, computer-readable medium of claim 14, wherein the first amount and the second amount are determined to be the same and the first random number and the second random number are determined to be the same if $g^a h^b = CT^x$, $u2^a v2^c = DZ\_B1^x$, and $u2^b v2^d = EZ\_B2^x$, where $T=g^t h^t$ is the commitment value of the amount of the balance transfer, $Z\_B1=u2^r v2^{z1}$, $Z\_B2=u2^r v2^{z2}$.

16. A system, comprising:
   one or more computers; and
   one or more computer-readable memories coupled to the one or more computers and having instructions stored thereon which are executable by the one or more computers to perform operations comprising:
   receive, from a first account:
      a digitally signed copy of a commitment value of a first amount of a balance transfer from a first account to a second account generated based on a first random number, wherein the first amount of the balance transfer and the first random number are encrypted using a first public key of the first account based on a probabilistic homomorphic encryption (HE) algorithm;
      a second amount of the balance transfer and a second random number, wherein the second amount and the second random number are encrypted using a public key of the second account based on the probabilistic HE algorithm;
one or more range proofs; and
a set of values generated based on one or more selected random numbers;

verify a digital signature corresponding to the digitally signed copy using a second public key of the first account corresponding to a private key used to generate the digital signature;

determine that the one or more range proofs prove that the amount of the balance transfer is greater than zero and less than or equal to a balance of the first account;

determine if the first amount and the second amount are the same and if the first random number and the second random number are the same based on the encrypted first and second amounts, the encrypted first and second random numbers, and the set of values; and update the balance of the first account and a balance of the second account based on the first amount of the balance transfer in response to determining the first amount and the second amount are the same and the first random number and the second random number are the same, wherein the selected random numbers are represented by $r^*$, $t^*$, $z1^*$, and $z2^*$; the selected random numbers are used to generate a, b, c, d, C, D, and E; where $a=r^*+xr$, $b=t^*+xt$, $c=z1^*+xz1$, $d=z2^*+xz2$, $C=g^{r^*}h^{t^*}$, $D=u2^{r^*}v2^{z1^*}$, and $E=u2^{t^*}v2^{z2^*}$, where r is the first random number, t is the first amount of the balance transfer, z1 and z2 are random numbers used to encrypt the second transaction amount and the second random number, x is a hash value generated based on hashing C, D, E, and g, and where h, u2, and v2 are generators of an elliptical curve.

* * * * *

UNITED STATES PATENT AND TRADEMARK OFFICE
CERTIFICATE OF CORRECTION

PATENT NO. : 10,664,835 B2
APPLICATION NO. : 16/390260
DATED : May 26, 2020
INVENTOR(S) : Baoli Ma and Wenbin Zhang Page 1 of 1

It is certified that error appears in the above-identified patent and that said Letters Patent is hereby corrected as shown below:

In the Claims

In Claim 1, Column 17, Line 7, delete "b=+xt," and insert -- b=t*+xt, --, therefor.

Signed and Sealed this
Thirteenth Day of October, 2020

Andrei Iancu
*Director of the United States Patent and Trademark Office*